(12) United States Patent
Ding et al.

(10) Patent No.: US 9,577,883 B2
(45) Date of Patent: Feb. 21, 2017

(54) METHOD AND SYSTEM OF AUTOMATED COMPLIANCE MANAGEMENT

(71) Applicants: Heidi Ding, Austin, TX (US); Jianwen Yin, Round Rock, TX (US); Marshal F. Savage, Austin, TX (US); William James Widener, Austin, TX (US)

(72) Inventors: Heidi Ding, Austin, TX (US); Jianwen Yin, Round Rock, TX (US); Marshal F. Savage, Austin, TX (US); William James Widener, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 267 days.

(21) Appl. No.: 13/871,698

(22) Filed: Apr. 26, 2013

(65) Prior Publication Data
US 2014/0325035 A1   Oct. 30, 2014

(51) Int. Cl.
*H04L 12/24* (2006.01)
*H04L 29/06* (2006.01)

(52) U.S. Cl.
CPC .......... *H04L 41/082* (2013.01); *H04L 63/107* (2013.01)

(58) Field of Classification Search
CPC ......... G06Q 10/00; G06Q 10/06; G06Q 10/10
USPC ...................................................... 709/220
See application file for complete search history.

(56) References Cited

U.S. PATENT DOCUMENTS

| | | | |
|---|---|---|---|
| 5,617,533 A * | 4/1997 | Wu et al. ..................... 714/38.1 |
| 2003/0217036 A1* | 11/2003 | Haunschild et al. ............. 707/1 |
| 2005/0060417 A1* | 3/2005 | Rose ............................... 709/228 |
| 2005/0066015 A1* | 3/2005 | Dandekar et al. ............ 709/220 |
| 2007/0240104 A1* | 10/2007 | Martinez et al. .............. 717/104 |
| 2012/0130914 A1* | 5/2012 | Kinghorn ............. G06Q 10/101 705/317 |
| 2012/0143778 A1* | 6/2012 | Sundaram ............ G06Q 30/018 705/317 |
| 2013/0198090 A1* | 8/2013 | Singh ..................... G06Q 10/10 705/309 |
| 2013/0226757 A1* | 8/2013 | Bouma .................. G06Q 40/02 705/35 |
| 2013/0246291 A1* | 9/2013 | Dick et al. ..................... 705/317 |

FOREIGN PATENT DOCUMENTS

WO   WO 2011115983 A1 *   9/2011

OTHER PUBLICATIONS

Basu, How to Trace an IP Address to a PC & How to Find Your Own, Aug. 11, 2009, www.makeuseof.com (5 pages).*

* cited by examiner

*Primary Examiner* — Wing F Chan
*Assistant Examiner* — Leon Y Tseng
(74) *Attorney, Agent, or Firm* — Baker Botts L.L.P.

(57) ABSTRACT

A method and system of automated compliance management is disclosed. The method includes receiving an application call from a remote information handling system (IHS) running an application, the application including a function configured to invoke the application call. The method also includes determining a location of operation of the remote IHS and determining a compliance criterion of the application based on the location of operation of the remote IHS. The method further includes sending a response to the application call from the remote IHS, the response including information for configuring the application to comply with the compliance criterion. Associated apparatuses and systems are disclosed.

20 Claims, 6 Drawing Sheets

METHOD AND SYSTEM OF AUTOMATED COMPLIANCE MANAGEMENT

TECHNICAL FIELD

The present disclosure relates generally to information handling systems, and more particularly to a method and system of automated compliance management.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may be used in a variety of locations and industries throughout the world. Each location and/or industry may be required to comply with its own set of regulations or standards. Because different locations throughout the world use different regulations and standards, the costs associated with compliance with those varied regulations and standards may be high.

SUMMARY

In one embodiment, a method is disclosed includes receiving an application call from a remote information handling system (IHS) running an application, the application including a function configured to invoke the application call. The method also includes determining a location of operation of the remote IHS and determining a compliance criterion of the application based on the location of operation of the remote IHS. The method further includes sending a response to the application call from the remote IHS, the response including information for configuring the application to comply with the compliance criterion.

In another embodiment, a computer-readable medium containing instructions to be executed by a processor is disclosed. The instructions, when executed, are configured to receive an application call from a remote information handling system (IHS) running an application, the application including a function configured to invoke the application call. The instructions are further configured to determine a location of operation of the remote IHS and determine a compliance criterion of the application based on the location of operation of the remote IHS. The instructions are also configured to send a response to the application call from the remote IHS, the response including information for configuring the application to comply with the compliance criterion.

In a further embodiment, a system comprising a processor and a computer-readable medium containing instructions to be executed by the processor is disclosed. The instructions, when executed, are configured to receive an application call from a remote information handling system (IHS) running an application, the application including a function configured to invoke the application call. The instructions are further configured to determine a location of operation of the remote IHS and determine a compliance criterion of the application based on the location of operation of the remote IHS. The instructions are also configured to send a response to the application call from the remote IHS, the response including information for configuring the application to comply with the compliance criterion.

BRIEF DESCRIPTION OF THE DRAWINGS

A more complete understanding of the disclosed embodiments and advantages thereof may be acquired by referring to the following description taken in conjunction with the accompanying drawings, in which like reference numbers indicate like features, and wherein.

DETAILED DESCRIPTION

For the purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU)

or hardware or software control logic, ROM, and/or other types of nonvolatile memory. Additional components or the information handling system may include one or more disk drives, one or more network ports for communicating with external devices as well as various input and output (I/O) devices, such as a keyboard, a mouse, touchscreen and/or a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, a regulation may include any set of rules, requirements, or standards that may be applicable to an application, an IHS running an application, or interaction of an application with some other component, like another application or another IHS, or even a user of the IHS. A regulation may be set by an international, national, or regional entity, including governmental entities. Regulations may also be characterized as best practices or recommendations. Regulations may be based on the type of entity operating the IHS. For example, governmental agencies may be required to comply with specific regulations. Regulations may also be based on an industry or subject matter. For example, regulations may be imposed on the health care, banking, digital forensics, video surveillance, mobile clinic computing, or other industries. Additionally, regulations may be updated and changed at the discretion of the regulation-setting agency. As one example, an IHS running software to collect patient data in the United States may be required to comply with the Health Insurance Portability and Accountability Act (HIPAA), including any modifications or updates to that law created by Congress. For the purposes of this disclosure, a compliance criterion may include one or more regulations, requirements of regulations, or combinations thereof.

While various modules may be shown in the present disclosure, it should be appreciated that these designations may be logical designations to facilitate an understanding of the principles of the present disclosure. For example, more than one module may be grouped or implemented in a single module, or what may be illustrated as a single module may be implemented as multiple modules. A module may include, for example, an application, logic, instructions, program, script, library, shared library, function, add-in, or other suitable entity. Further, each module may be implemented as software, hardware, or combinations thereof.

An IHS may include a processor coupled to a memory. A processor may comprise, for example, a microprocessor, microcontroller, digital signal processor (DSP), application specific integrated circuit (ASIC), or any other digital or analog circuitry configured to interpret and/or execute program instructions and/or process data. In some embodiments, a processor may interpret and/or execute program instructions and/or process data stored in a memory. A memory may be configured in part or whole as application memory, system memory, or both. A memory may include any system, device, or apparatus configured to hold and/or house one or more memory modules. Each memory module may include any system, device or apparatus configured to retain program instructions and/or data for a period of time (e.g., computer-readable storage media). Instructions, logic, or data for configuring the operation of an IHS, such as configurations of components including modules, may reside in a memory for execution by a processor.

Figure 1:
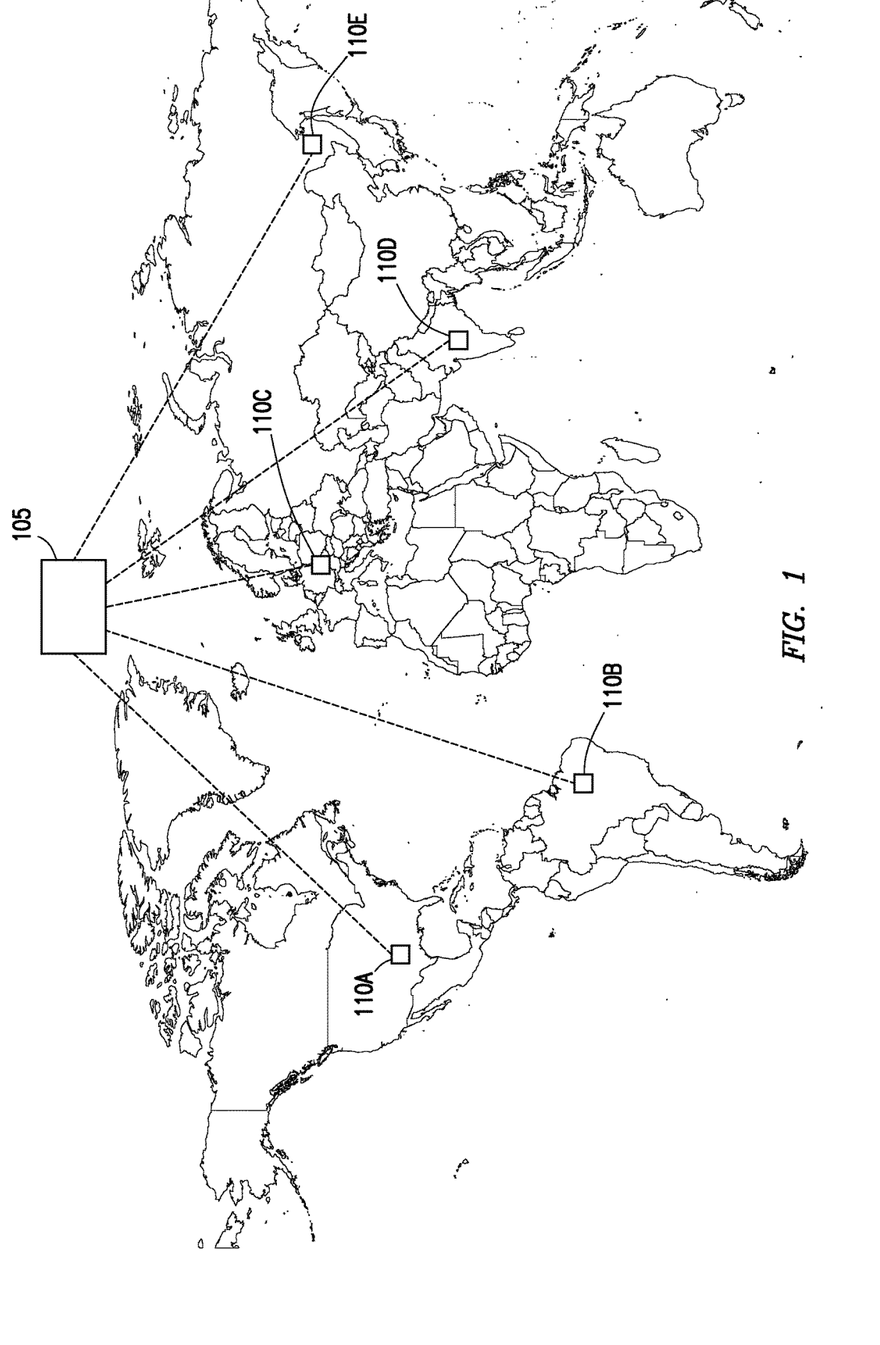
FIG. 1 illustrates an example distribution of systems operating in different locations, in accordance with the present disclosure.

FIG. 1 illustrates an example distribution of IHSs operating in different locations, in accordance with the present disclosure. As shown in FIG. 1, IHSs 110A, 110B, 110C, 110D, and 110E may be operating in various locations throughout the world. Each of these locations may have different regulations that should be complied with. Further, each of IHSs 110A-110E may be performing operations in the same or different applications spaces. Such application spaces may include different industries, vertical applications, or environments. For example, even if each of IHSs 110A-110E were all operating in the banking industry, the regulations may be different for each of IHSs 110A-110E because each location may have different regulations for their respective banking industries. Further, these regulations may change over time. However, these regulations may not be completely distinct from one another. For example, there may be partial, but not complete, overlap between the requirements of the regulations for the banking industry in the locations where IHSs 110A and 110C are operating.

In one embodiment, each of IHSs 110A-110E may be in communication with an automated compliance system 105 over a network. The term "network" may be interpreted as generically defining any network capable of transmitting telecommunication signals, data and/or messages. A network may include any suitable collection and arrangement of communications equipment supporting the transport and delivery of data. For example, a network may include one or a collection of components associated with a local area network (LAN), a wide area network (WAN), a back-haul network, an intranet, a global computer network such as the Internet, or any other communications equipment suitable for providing wireless and/or wireline communications. In some embodiments, a network may be an Internet Protocol (IP) network.

Automated compliance system 105 may be configured to facilitate compliance with the different regulations associated with the subject matter and/or location of IHSs 110A-110E. For example, automated compliance system 105 may provide regulatory requirements, software code, APIs, or some other response to facilitate IHSs 110A-110E's compliance with the applicable regulations.

Figure 2:
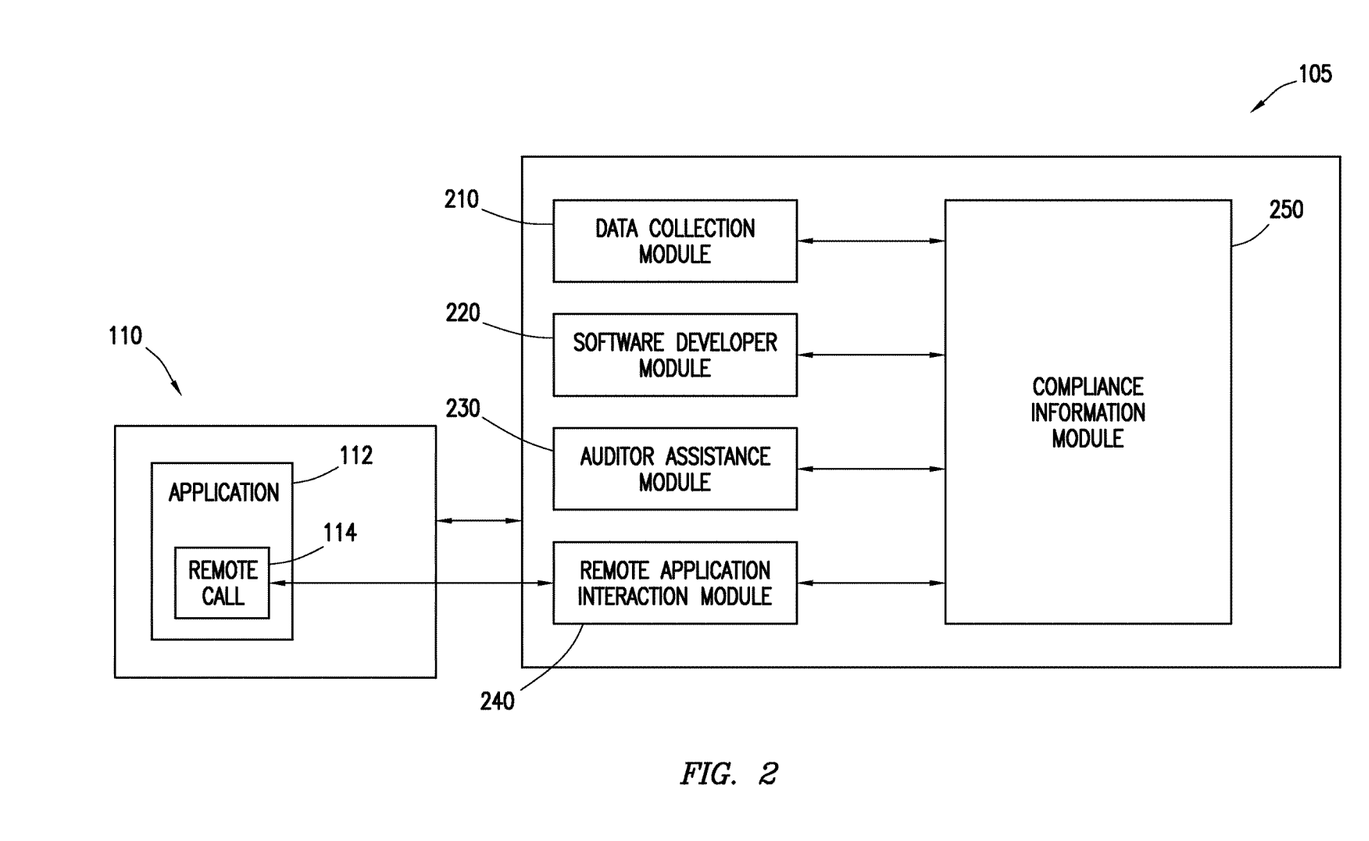
FIG. 2 illustrates an example embodiment of an automated compliance system in communication with a remote information handling system, in accordance with the present disclosure.

FIG. 2 illustrates an example embodiment of an automated compliance system in communication with an IHS, in accordance with the present disclosure. Automated compliance system 105 may include a data collection module 210, a software developer module 220, an auditor assistance module 230, and a remote application interaction module 240. Each of these modules 210, 220, 230, and 240, may be in communication with a compliance information module 250 and may be executed by a processor. IHS 110 may include an application 112 operating thereon containing at least one function that may be configured to initiate a remote application call 114.

Data collection module 210 may be configured to acquire and store information regarding regulations, including updating regulations. Software developer module 220 may be configured to generate applicable regulations or software code to be used by a software developer to develop software that is compliant with applicable regulations. Auditor assistance module 230 may be configured to generate and/or provide information to an auditor analyzing compliance with regulations. Remote application interaction module 240 may be configured to interact with a remote IHS to provide regulatory requirements, software code, APIs, or a response to facilitate compliance with applicable regulations. Compliance information module 250 may be configured to store and recall information regarding regulations, requirements of regulations, and other information associated with regulations.

Data collection module 210 may be configured to receive, retrieve, or collect data associated with a plurality of regulations. Data collection module 210 may further be configured to identify and store information about each regulation. For example, and in no way limiting, data collection module 210 may identify and store: geographical locations where compliance with a given regulation may be required; industries or subject matters that may require compliance with the given regulation; where the source of official information for the given regulation is located; how changes or updates to the given regulation are published or otherwise distributed; different levels of compliance within the given regulation; and mandatory requirements for compliance with the given regulation or a particular compliance level within the regulation. Data collection module 210 may facilitate the storage of this information about each regulation in compliance information module 250. For example, data collection module 210 may pass information associated with a regulation to compliance information module 250 with instructions indicating where and how the information should be stored and/or treated within compliance information module 250. In some embodiments, data collection module 210 may pass the information to compliance information module 250, and compliance information module 250 may determine how to store and/or treat the information.

Data collection module 210 may also map any overlap between requirements of different regulations stored in compliance information module 250. For example, if two regulations for different industries in the some location required 2048-bit Rivest Shamir Adleman (RSA) keys to be used, these requirements may overlap. Data collection module 210 may further indicate requirement prioritization for a given regulation or requirement. For example, requirement prioritization information may be used to resolve conflicts that may emerge between multiple requirements or regulations by complying with the highest priority requirement or regulation.

Figure 3:
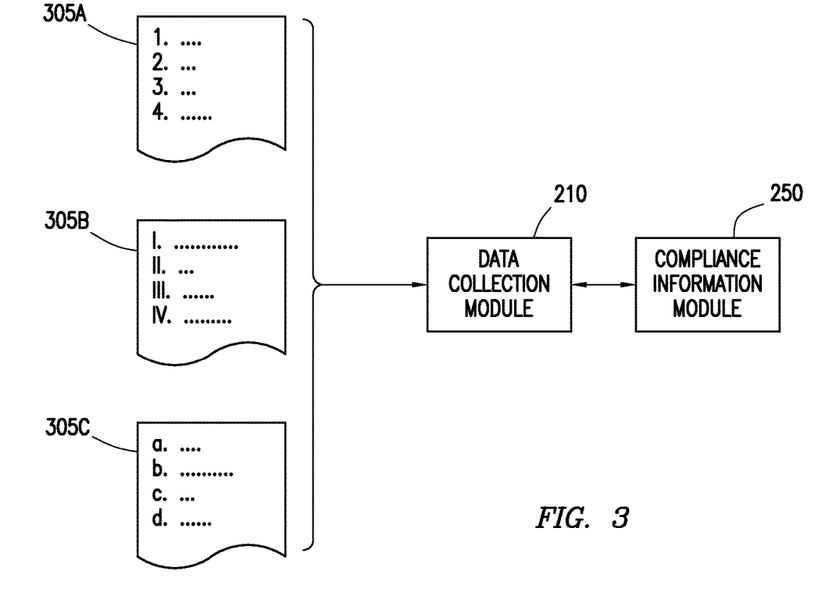
FIG. 3 illustrates an example embodiment of a data collection module, in accordance with the present disclosure.

FIG. 3 illustrates an example embodiment of data collection module 210. As shown in FIG. 3, data collection module 210 may receive or collect information from a plurality of regulations 305, including regulations 305A, 305B, and 305C. For example, data collection module 210 may be configured to retrieve an electronic copy of a regulation stored on an IHS designated as an official source of truth for the regulation, for example, a governmental agency's server. The electronic copy of the regulations may be stored and/or acquired in any computer-readable format, for example, American Standard Code for Information Interchange (ASCII) text, a hypertext markup language (HTML) file, an extensible markup language (XML) file, a word processing document, a portable document format (PDF) file, or other machine-readable files. Once acquired, data collection module 210 may then parse the electronic copy of regulations 305 or otherwise mine data from the electronic copy of regulations 305, including one or more requirements for each regulation 305. Alternatively, a physical copy of regulations 305 may be sent to a user of automated compliance system 105 and the physical copy may be scanned and passed electronically to data collection module 210. In some embodiments, the user of automated compliance system 105 may manually enter the requirements of regulations 305. Data collection module 210 may then facilitate the storage of information regarding regulations 305 in compliance information module 250.

Figure 4:
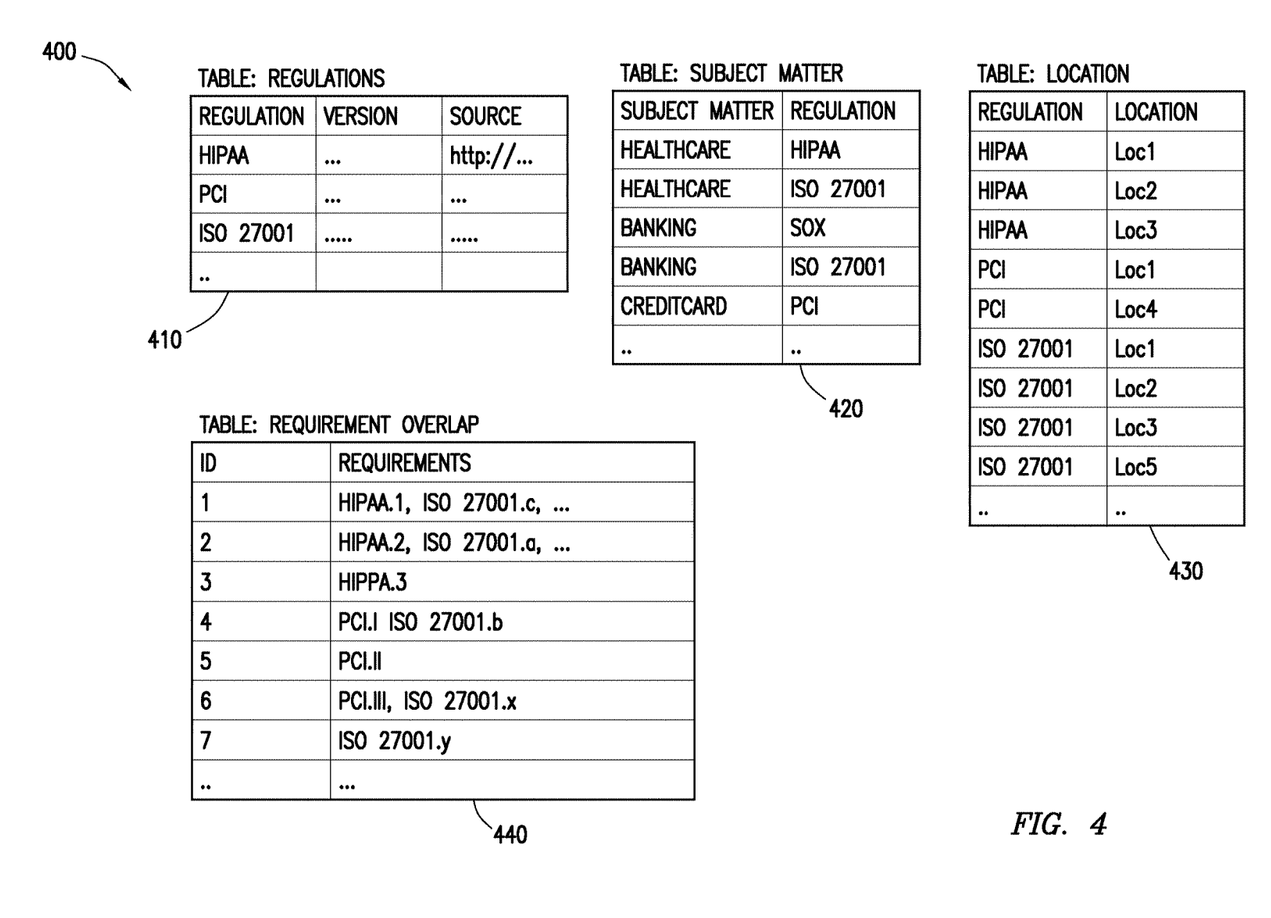
FIG. 4 illustrates an example embodiment of storage of information in an automated compliance system, in accordance with the present disclosure.

FIG. 4 illustrates an example embodiment of storage of information regarding regulations in an automated compliance system, in accordance with the present disclosure. Information may be stored in any acceptable manner, such as in a database 400. Although a single database 400 is shown, information may be stored in any suitable number and kinds of entities for storing such information. Database 400 may be implemented by, for example, a relational database, table, a distributed database, a file, a file system, a cloud data storage system, a data structure, or any combinations thereof. For example, FIG. 4 illustrates example tables 410, 420, 430, and 440 that may be utilized in database to store information accessible to or under the management of compliance information module 250. While each of tables 410, 420, 430, and 440 are shown as part of database 400, they may each be implemented separately in different databases. Information stored in database 400 may be stored after collection by data collection module 210.

As shown in FIG. 4, a first table 410 may include a name of a regulation (for example, HIPAA, Payment Card Industry (PCI), International Organization of Standards (ISO) 27001), the version of the regulation, and the official source of information for the standard. A second table 420 may include the subject matter of a regulation. For example, the healthcare industry may have entries for both HIPAA and ISO 27001. The banking industry may have entries for the Sarbanes-Oxley Act (SOX) as well as ISO 27001. The credit card industry may have entries for PCI. A third table 430 may include locations in which compliance with a given regulation is required. For example, using Loc1-Loc5 as different locations, Loc1, Loc2, and Loc3 may require compliance with HIPAA. Loc1 and Loc4 may require compliance with PCI. Loc1, Loc2, Loc3, and Loc5 may require compliance with ISO 27001. A fourth table 440 may indicate the overlap between requirements from given regulations. For example, a first requirement of HIPAA may be given an ID of "1," and may overlap with a third requirement of ISO 27001. A second requirement of HIPAA may be given an ID of "2" and may overlap with a first requirement of ISO 27001. A third requirement of HIPAA may be given an ID of "3," and may not overlap with any requirements. A first requirement of PCI may be given an ID of "4," and may overlap with a second requirement of ISO 27001. A second requirement of PCI may be given an ID of "5" and may not overlap with any requirements. A third requirement of PCI may be given an ID of "6" and may overlap with a twenty-fourth requirement of ISO 27001. A twenty-fifth requirement of ISO 27001 may be given an ID of "7" and may not overlap with any requirements.

While a variety of tables and entries in the tables are illustrated in FIG. 4, it will be appreciated that these tables are merely examples of how information may be organized in compliance information module 250, and are in no way limiting. Data collection module 210 as illustrated in FIG. 2 may be configured to update the information contained in compliance information module 250. For example, when a new version of a regulation is released, data collection module 210 may parse the official source of information regarding that regulation to determine if any changes to the requirements have been made. Any changes may be stored in compliance information module 250, and the version information may be updated for the given regulation. In some embodiments, data collection module 210 may periodically search for updates via an automated process, for example, at given time intervals like every month, or every quarter. For example, data collection module 210 may analyze the version number of a given regulation at the server containing the official source of truth for that regulation, and may determine if the version of the regulation stored on the source of truth server is the same as that stored in compliance information module 250. In some embodiments, a user may direct data collection module 210 to search for updates to the regulations.

Figure 5:
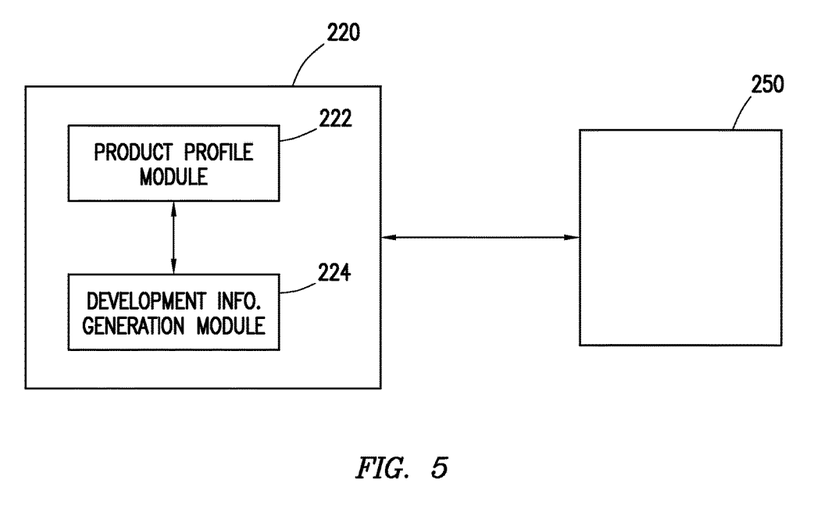
FIG. 5 illustrates an example embodiment of a software developer module, in accordance with the present disclosure.

FIG. 5 illustrates an example embodiment of software developer module 220, in accordance with the present disclosure. Software developer module 220 may include a product profile module 222 and a development information generation module 224.

Product profile module 222 may be configured to create a profile of a software product to ascertain what regulations may be applicable to a given product. The profile may be generated as a series of questions is posed to software developer regarding the product they intend to develop. These questions may be automatically generated by product profile module 222 or may be manually entered by an operator of automated compliance system 105. The questions may be presented in a series of user interface screens. For example, the questions may be used to determine the locations in which the product may be used, the industry or subject matter the product will be applicable to or used in, types of communications that will be sent to or from the product, what level of Governance, Risk, and Compliance (GRC) is desired for the product, or other related questions. For example, a software developer may be developing software for an organization that implements its own GRC levels to control compliance with its own internal benchmarks in addition to various regulations. The software developer may be asked questions about the particular GRC levels and compliance requirements for those GRC levels.

The questions used by product profile module 222 may be administered in an automated fashion, for example, by a series of user interface screens, or other sequential process. The answers to these questions may be used to generate a profile of the product indicating the regulations and requirements of those regulations that are to be complied with. This profile may then be passed to development information generation module 224. The profile may be maintained in long-term storage, for example, in a hard drive or flash drive. Alternatively, the profile may be used only temporarily by development information generation module 224 and then discarded.

Development information generation module 224 may be configured to generate information useful to a software developer based on the profile created by product profile module 222. Such information may include, for example, software code, a list of requirements and/or regulations, or functions to use within their software code. Alternatively, rather than using the profile created by product profile module 222, development information generation module 224 may receive direct user input indicating what regulations and/or specific requirements are desired to be complied with. Development information generation module 224 may produce a variety of developmental information. For example, in some embodiments, a simple list of regulations and/or requirements associated with those regulations may be generated. This may allow a software developer to have a complete list of regulations and/or a list of requirements required for compliance before developing a software product. In this way, a software developer may have guidelines when developing the product.

In some embodiments, an example set of computer instructions, such as software code, compliant with the generated list of requirements may be generated by development information generation module 224 to be provided to a software developer. Such instructions may make up one or more functions. In some embodiments, one or more such functions may make up or may be configured to call an application programming interface (API). Such an API may be provided to allow the developer to use the same function calls for various programs or program instances. A call to the API in an instance of a user application may thus be used for multiple operating environments. The results of making the API call may depend upon where or from what the call is made. For example, the results of the API call may vary for a given location or industry. Accordingly, execution of the application may be compliant in such variable operating environments even when the same program is executed in such variable environments.

The term "call" may refer to a command from within an application that references a step or series of steps to be taken. This may be done by calling a function, routine, a sub-routine, or some other series of steps. A call may reference steps contained within the same program or some other program or library. Further, the other program or library may be stored remotely from where the application is being executed. This may be referred to as a remote application call. A call may be invoked by a module, application, logic, instructions, program, script, library, shared library, function, add-in, or other suitable entity.

In some embodiments, the example set of instructions may be provided to a software developer as an end product. Thus, compliance as of a certain date may be guaranteed but compliance in the future may not be guaranteed. In such an embodiment, the software developer may have to remain up to date on modifications or changes to the regulations applicable to their product, and revise their product accordingly for continued compliance.

With reference to FIG. 2, auditor assistance module 230 may also be implemented as part of automated compliance system 105. Auditor assistance module 230 may be configured to generate a report or other information beneficial to an auditor in determining whether a product is compliant with applicable regulations. An auditor may be any individual, entity, or body interested in determining the compliance of a product with a regulation. For example, an auditor may be a person or department within a company developing software, or an auditor may be an outside firm hired to analyze the compliance of a product with a regulation. Automated compliance system 105 may provide an auditor a report of requirements that is not tied to any specific product, or may generate a report regarding compliance for a given product.

When generating a report in the abstract, an auditor may be guided through a similar set of questions to that used by product profile module 222 shown in FIG. 5. For example, an auditor may indicate the location, industry, GRC level, other regulations to be complied with, or any combination thereof that the auditor is interested in. In response, auditor assistance module 230 may ascertain the regulations and corresponding requirements as indicated in compliance information module 250. Auditor assistance module 230 may then provide a list of regulations and corresponding requirements in order to be compliant with those regulations.

When generating a report about a specific product, an auditor may be guided through a set of questions to allow the auditor to indicate the location, industry, GRC level, other regulations to be complied with, or any combination thereof for the product. The appropriate regulations and/or requirements may be ascertained by referencing information stored in compliance information module 250. Auditor assistance module 230 may then change the stored information into a regulation-specific format. For example, if a given regulation uses certain terminology, that terminology may be used in the report, or if a specific format of compliant documentation is required, the report may take that form of documentation. Additionally, portions of code and/or APIs corresponding to compliance with a given requirement may be included in the report. This report may then be provided to the auditor. The report may be provided in an electronic format via email or some other delivery method, for example, as ASCII text, an HTML file, an XML file, a word processing document, a PDF file, or other machine-readable file. In some embodiments, the report may be provided as a physical rendition, for example a printed copy, of the report. This may allow an auditor automated access to the requirements of a given regulation and the implementation of code and/or APIs that meet the requirements of the given regulation.

In some embodiments, compliance with regulations may be further managed by automated compliance system 105. With reference to FIG. 2, remote application interaction module 240 may also be implemented as part of automated compliance system 105. Remote application interaction module 240 may be configured to receive a remote application call 114 from a function within an application 112 running on remote IHS 110, and provide a response to remote application call 114 that is compliant with the requirements of the applicable regulations. For example, a set of functions may be provided to a software developer to be used when developing a new product. These functions may be configured to invoke remote application call 114 that communicates with remote application interaction module 240. These functions may be utilized in any portion of software code which may be implicated in compliance with a given regulation. The software developer may be provided language-specific functions, or may be provided generic functions that may be applicable for multiple languages. In one embodiment, rather than merely providing an API that the function refers to, the function may refer to the automated compliance system 105 itself, via remote application interaction module 240. By the software developer using the provided functions, when remote application call 114 is received, remote application interaction module 240 may determine what location, what industry or subject matter, or what level of GRC is appropriate for application 112. Remote application interaction module 240 may then use that information to ascertain the applicable regulations and requirements stored in compliance information module 250 that are pertinent to application 112 as. Remote application interaction module 240 may then provide a response to remote application call 114 that is compliant with the applicable regulations. The response may include appropriate software code, routines, or functions configured to be compliant when executed. Alternatively, the response may include results from application call 114, such as a list of requirements. IHS 110 running the developed application may determine, from such a list of requirements, which option from a variety of options may be used to be compliant.

A software developer may only develop a single application using the functions provided and the developed software will be compliant with regulations regardless of location or industry. For example, if a software developer wanted to write a software program for collecting and storing medical data to be used in multiple locations, a single program could be written including functions invoking the remote application calls that would be directed to remote application interaction module 240. The results of the remote application calls may be used for compliant implementation of the operations that are appropriate for the location in which the application is being used. By using the provided functions, a software developer's concern for compliance may be simplified by the appropriate remote application calls within the developed application. One or more compliance issues, including addressing modifications and updates to the regulations, may be addressed at automated compliance system 105.

Figure 6:
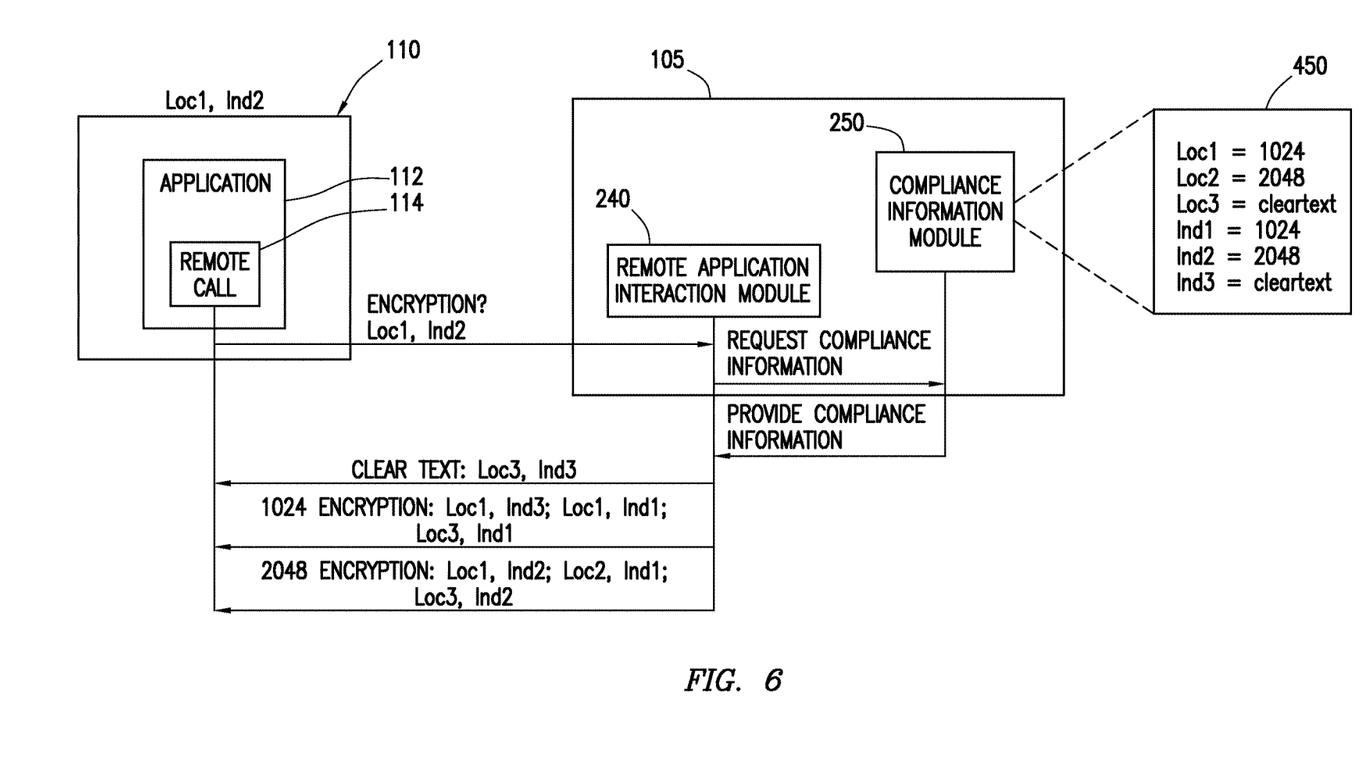
FIG. 6 illustrates an example embodiment of an interaction between an information handling system and an automated compliance system, in accordance with the present disclosure.

As an example, and in no way limiting, FIG. 6 illustrates an example operation of application 112 interacting with remote application interaction module 240. As shown in FIG. 6, IHS 110 is operating at a location Loc1 and operation in an industry Ind2. When application 112 is run on IHS 110, a function may invoke remote application call 114. This may include a function that may use encryption information regarding RSA keys. Remote application call 114 may interact with remote application interaction module 240 of automated compliance system 105. When remote application call 114 is received, remote application interaction module 240 may determine the location and industry in which IHS 110 is operating. As shown in FIG. 6, IHS 110 may supply that information to remote application interaction module 240 when remote application call 114 is invoked. Alternatively, rather than making this determination based on supplied information, remote application interaction module 240 may determine the location and industry of IHS 110 by other means described herein. For example, interaction module 240 may determine the location and/or industry by utilizing a lookup table or analyzing the communication path between IHS 110 and automated compliance system 105. This information may be stored in compliance information module 250.

Compliance information module 250 may contain information stored in table 450 showing the requirements of regulations for each of three locations and three industries. Loc1 and Ind1 may require 1024-bit encryption, Loc2 and Ind2 may require 2048-bit encryption, and Loc3 and Ind3 may allow utilization of clear text. Based on the determination of the location and industry in which IHS 110 is operating, remote application interaction module 240 may communicate with compliance information module 250 to request the appropriate level of encryption to use for an RSA key to be compliant. Compliance information module 250 may provide remote application interaction module 240 with the appropriate information. Remote application interaction module 240 may then provide a response to remote application call 114.

The response provided may include only the information that a 2048-bit RSA key is to be generated. In such an embodiment, IHS 110 may then use an API stored locally to implement the received information and generate a 2048-bit RSA key. In alternative embodiments, remote application interaction module may retrieve actual software code, configuration/rule (for example and in no way limiting, pass-word complexity, protocol configuration, or data at rest encryption level) or an actual API from compliance information module 250 that may be sent to IHS 110 for use in application 112. In either embodiment, the information or the software programming provided contain the compliance requirements as stored and updated in compliance information module 250.

Figure 7:
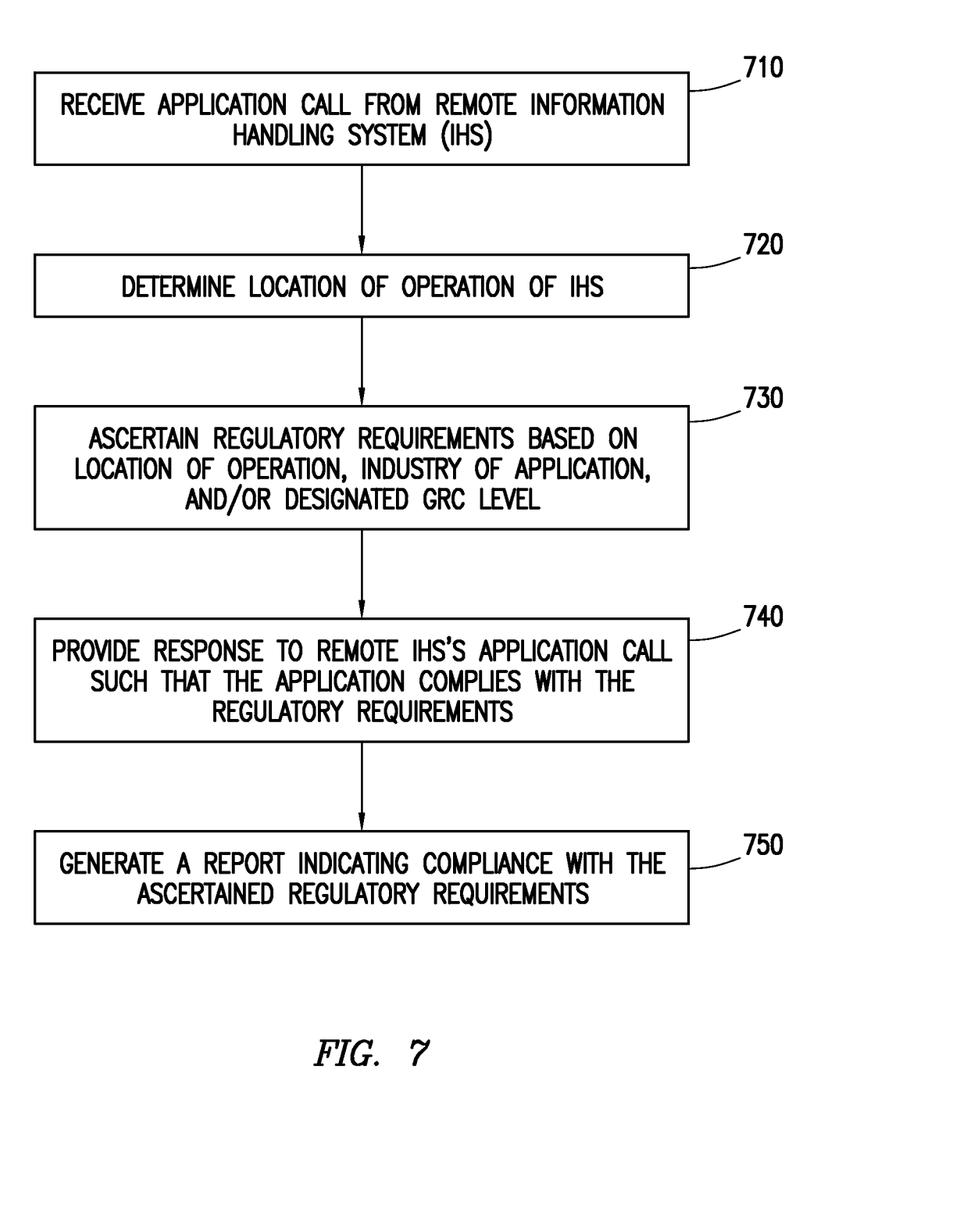
FIG. 7 illustrates a flow chart of an example set of operations for automated compliance management, in accordance with the present disclosure.

FIG. 7 illustrates an example set of operations for automated compliance management. The set of operations illustrated in FIG. 7 may be implemented using automated compliance system 105 shown in FIG. 2. At operation 710, an application call may be received from a remote IHS at an automated compliance system. The remote IHS may be running an application including a function that invokes a remote application call. The remote application call may be received by a remote application interaction module of the automated compliance system. At operation 720, the location of operation of the remote IHS is determined. The determination may be done by analyzing the communication path between the remote IHS and the automated compliance system or the data communicated from the remote IHS to the automated compliance system. Alternatively, the determination of location may be done by observing a table including identifying information regarding the remote IHS or remote application, including location information.

At operation 730, the regulatory requirements of the application may be determined. Determining the regulatory requirements may be done based on the location of operation of the remote IHS, the industry or subject matter of the application, a GRC level manually designated by a software developer, or any combinations thereof. To ascertain the regulatory requirements of the application, the remote application interaction module may look up the requirements of applicable regulations as stored within a compliance information module of the automated compliance system.

At operation 740, a response may be provided to the remote application call by the remote application interaction module such that the operation of the application on the remote IHS is in compliance with the applicable regulations. For example, if it is determined that the application is operating in a location and industry that requires a 2048-bit RSA key rather than a 1024-bit RSA key and the application call is to generate an appropriate key, the response may include a key being generated with the compliant 2048-bit RSA key.

At operation 750, a report may be generated indicating compliance with the ascertained regulatory requirements. For example, if a location and industry require a 2048-bit RSA key, a report may include information indicating that such is implemented to meet the specific rule and regulations and further may include the code implementing the generation of the compliant RSA key.

While the operations shown in FIG. 6 are shown in a linear fashion, it will be appreciated that they may be done in various orders, and some operations may be omitted. For example, if a report is all that is being provided, only operations 720, 730 and/or 750 may be performed. As another example, step 750 may be omitted completely.

Although the present disclosure has been described in detail, it should be understood that various changes, substitutions, and alterations can be made hereto without departing from the spirit and the scope of the disclosure as defined by the appended claims.

What is claimed is:

1. A method comprising:
receiving, at an automated compliance system, an application call from a remote information handling system (IHS) running an application, the application including a function configured to invoke the application call, the application call received by the automated compliance system over a network via a network communication path between the automated compliance system and the remote IHS;
determining a location of operation of the remote IHS by analyzing the network communication path;
determining a compliance criterion of the application based on the location of operation of the remote IHS by:
automatically generating and updating a database of regulatory requirements, including a first regulatory requirement and a second requirement;
identifying from the database, based on the location of operation of the remote IHS, the regulatory requirements that apply to the remote IHS;
generating an order of priority for the first regulatory requirement and the second regulatory requirement based on a determination that the first regulatory requirement and the second requirement both apply to the remote IHS, and further based on a determination that the first regulatory requirement conflicts with the second regulatory requirement,
generating the compliance criterion based on the identified regulatory requirements and the order of priority, the compliance criterion including a level of encryption;
sending a response to the application call from the remote IHS, the response including information for configuring the application to comply with the compliance criterion; and
configuring the application to comply with the compliance criterion based on the response.

2. The method of claim 1, wherein the compliance criterion is set by one of a government, regulatory body, or standards-setting entity.

3. The method of claim 1, further comprising:
receiving a second application call;
wherein both the application call and the second application call are the same.

4. The method of claim 3, wherein the response to the application call is different than the response to the second application call.

5. The method of claim 1, wherein the compliance criterion is based on a subject matter on which the application operates.

6. The method of claim 1, further comprising generating a report indicating the compliance of the application with the compliance criterion.

7. The method of claim 1, further comprising generating software code including at least the function.

8. A non-transitory computer-readable medium containing instructions, that when executed by a processor, are configured to:
receive, at an automated compliance system, an application call from a remote information handling system (IHS) running an application, the application including a function configured to invoke the application call, the application call received by the automated compliance system over a network via a network communication path between the automated compliance system and the remote IHS;
determine a location of operation of the remote IHS by analyzing the network communication path;

determine a compliance criterion of the application based on the location of operation of the remote IHS, wherein the instructions to determine the compliance criterion are configured to:
automatically generate and update a database of regulatory requirements, including a first regulatory requirement and a second requirement;
identifying from the database, based on the location of operation of the remote IHS, the regulatory requirements that apply to the remote IHS;
generating an order of priority for the first regulatory requirement and the second regulatory requirement based on a determination that the first regulatory requirement and the second requirement both apply to the remote IHS, and further based on a determination that the first regulatory requirement conflicts with the second regulatory requirement,
generating the compliance criterion based on the identified regulatory requirements and the order of priority, the compliance criterion including a level of encryption;
send a response to the application call from the remote IHS, the response including information for configuring the application to comply with the compliance criterion; and
cause the application to comply with the compliance criterion based on the response.

9. The non-transitory computer-readable medium of claim 8, wherein the compliance criterion is set by one of a government, regulatory body, or standards-setting entity.

10. The non-transitory computer-readable medium of claim 8, the instructions further configured to:
receive a second application call;
wherein both the application call and the second application call are the same.

11. The non-transitory computer-readable medium of claim 10, wherein the response to the application call is different than the response to the second application call.

12. The non-transitory computer-readable medium of claim 8, wherein the compliance criterion is based on a subject matter on which the application operates.

13. The non-transitory computer-readable medium of claim 8, further comprising instructions configured to generate a report indicating the compliance of the application with the compliance criterion.

14. The non-transitory computer-readable medium of claim 8, further comprising instructions configured to generate software code including at least the function.

15. A system comprising:
an automated compliance system; and
a remote information handling system (IHS);
the automated compliance system including:
a processor; and
a non-transitory computer-readable medium containing instructions, that when executed by the processor, are configured to:
receive an application call from the remote IHS running an application, the application including a function configured to invoke the application call, the application call received by the automated compliance system over a network via a network communication path between the automated compliance system and the remote IHS;
determine a location of operation of the remote IHS by analyzing the network communication path;
determine a compliance criterion of the application based on the location of operation of the remote IHS, wherein the instructions to determine the compliance criterion are configured to:
automatically generate and update a database of regulatory requirements, including a first regulatory requirement and a second requirement;
identify from the database, based on the location of operation of the remote IHS, the regulatory requirements that apply to the remote IHS;
generate an order of priority for the first regulatory requirement and the second regulatory requirement based on a determination that the first regulatory requirement and the second requirement both apply to the remote IHS, and further based on a determination that the first regulatory requirement conflicts with the second regulatory requirement,
generate the compliance criterion based on the identified regulatory requirements and the order of priority, the compliance criterion including a level of encryption;
send a response to the application call from the remote IHS, the response including information for configuring the application to comply with the compliance criterion;
the remote IHS including:
a second processor; and
a second non-transitory computer-readable medium containing instructions, that when executed by the second processor, are configured to cause the application to comply with the compliance criterion based on the response.

16. The system of claim 15, the instructions further configured to:
receive a second application call;
wherein both the application call and the second application call are the same.

17. The system of claim 16, wherein the response to the application call is different than the response to the second application call.

18. The system of claim 15, wherein the compliance criterion is based on a subject matter on which the application operates.

19. The system of claim 15, the instructions further configured to generate a report indicating the compliance of the application with the compliance criterion.

20. The system of claim 15, the instructions further configured to generate software code including at least the function.

* * * * *